United States Patent
Singh (10) Patent No.: US 11,533,439 B2
(45) Date of Patent: Dec. 20, 2022

(54) MULTI CAPTURE SETTINGS OF MULTI LIGHT PARAMETERS FOR AUTOMATICALLY CAPTURING MULTIPLE EXPOSURES IN DIGITAL CAMERA AND METHOD

(71) Applicant: Sanjeev Kumar Singh, Alpharetta, GA (US)

(72) Inventor: Sanjeev Kumar Singh, Alpharetta, GA (US)

( * ) Notice: Subject to any disclaimer, the term of this patent is extended or adjusted under 35 U.S.C. 154(b) by 113 days.

(21) Appl. No.: 16/887,923

(22) Filed: May 29, 2020

(65) Prior Publication Data
US 2021/0377433 A1    Dec. 2, 2021

(51) Int. Cl.
*H04N 5/235*    (2006.01)
*H04N 5/353*    (2011.01)
*G03B 7/10*    (2021.01)

(52) U.S. Cl.
CPC ............ *H04N 5/2353* (2013.01); *G03B 7/10* (2013.01); *H04N 5/2352* (2013.01); *H04N 5/2356* (2013.01); *H04N 5/3532* (2013.01)

(58) Field of Classification Search
CPC .. H04N 5/2353; H04N 5/3532; H04N 5/2352; H04N 5/2356; G03B 7/10
See application file for complete search history.

(56) References Cited

U.S. PATENT DOCUMENTS

| 5,333,027 | A | * | 7/1994 | Matsushima | ............ G02B 7/28 396/130 |
| 2005/0212955 | A1 | * | 9/2005 | Craig | ..................... H04N 5/335 348/362 |
| 2006/0044444 | A1 | * | 3/2006 | Okamoto | ................. 348/333.05 |
| 2006/0181614 | A1 | * | 8/2006 | Yen | ..................... H04N 5/23222 348/222.1 |
| 2008/0186387 | A1 | * | 8/2008 | Iwamoto | .............. H04N 9/8227 348/E5.037 |
| 2009/0251591 | A1 | * | 10/2009 | Whitham | ............. H04N 5/2353 348/362 |
| 2012/0274806 | A1 | * | 11/2012 | Mori | ..................... H04N 5/2356 348/222.1 |
| 2013/0179831 | A1 | * | 7/2013 | Izaki | ................... G06F 3/04847 715/800 |
| 2014/0022408 | A1 | * | 1/2014 | Nashizawa | .......... H04N 5/2352 348/222.1 |

(Continued)

*Primary Examiner* — Jason A Flohre
(74) *Attorney, Agent, or Firm* — Sanjeev K. Singh (57) ABSTRACT

An electronic camera comprising an image sensor configured to capture an electronic image and a shutter mechanism. The electronic camera further comprises a controller configured to control the shutter mechanism and the image sensor. The controller comprising a processor and a memory having computer-readable code embodied therein which, when executed by the processor, causes the controller to: open the shutter mechanism, allow light to reach the image sensor for an exposure, automatically cause the image sensor to capture a first digital image of a scene using a first capture setting and automatically cause the image sensor to capture a second digital image of the scene using a second capture setting. The first capture setting includes a first value and the second capture setting includes a second value respectively of at least one of an aperture parameter, a shutter speed parameter, an ISO sensor gain parameter.

9 Claims, 9 Drawing Sheets

(56) References Cited

U.S. PATENT DOCUMENTS

| | | | |
|---|---|---|---|
| 2015/0077603 A1* | 3/2015 | Matsuzawa | H04N 5/2351 348/297 |
| 2015/0130981 A1* | 5/2015 | Hagiwara | H04N 5/232939 348/333.02 |
| 2016/0100103 A1* | 4/2016 | Takahashi | G06T 7/223 348/222.1 |
| 2017/0171446 A1* | 6/2017 | Nashizawa | H04N 5/2355 |
| 2018/0077358 A1* | 3/2018 | Shintani | H04N 5/232939 |
| 2019/0335077 A1* | 10/2019 | Rieveschl | H04N 5/23212 |
| 2020/0007756 A1* | 1/2020 | Tsuchiya | H04N 5/2353 |

\* cited by examiner

(The figure shows exposure triangle chart with ISO, SHUTTER, and APERTURE rows, displayed upside-down in the image.)

MULTI CAPTURE SETTINGS OF MULTI LIGHT PARAMETERS FOR AUTOMATICALLY CAPTURING MULTIPLE EXPOSURES IN DIGITAL CAMERA AND METHOD

BACKGROUND

1. Field

Aspects of the present invention relates to photography and photographic equipment and more particularly relates to multi-light parameter and multi-capture setting multiple exposures automatically capturing digital camera and method.

2. Description of the Related Art

Casual photographers often compose scenes in a manner that is appealing to them when seen through a camera viewfinder, but is later found to be unappealing when seen in a resulting photographic print or other final image. Instruction on how to take better photographs is readily available in books, in classes, and the like; but such modes of instruction are burdensome to access during picture taking and are not much used by casual photographers. This is unfortunate, since the result is that many people repeat the same mistakes over and over, and also miss out on the fun of learning how to take better photographs.

Software is widely available that allows for the easy manipulation of digital images. Digital cameras can be used to capture images which are then modified using such software after downloading to a computer. This is a powerful approach, but lacks immediacy, since the images are not manipulated on the camera.

Digital cameras necessarily make some modifications of captured images. Some cameras also allow the user to selectively modify some images. A novice is likely to be confused if he or she attempts to modify images during a picture taking session. Modifying images on a camera after a picture taking session is less confusing, but remains complex unless user choices are strictly limited.

One reason for modifying captured images is correction of mistakes by the user and improvement of photographic technique. The widely available educational materials for this purpose are of little help to a user during a picture taking session.

It would thus be desirable to provide an improved camera and method.

SUMMARY

Briefly described, aspects of the present invention relate to an improved camera and method in which the camera automatically captures multiple exposures with a multi-light variable and a multi-capture setting configuration. The invention is defined by the claims. The invention, in its broader aspects, provides a camera and a method in which for example three light-variables or light-parameters including an aperture, a shutter speed and an ISO sensor gain are manipulated to provide for example six capture settings for six exposures.

In accordance with one illustrative embodiment of the present invention, an electronic camera is provided. The electronic camera comprises an image sensor configured to capture an electronic image, an input system comprising a shutter mechanism configured to be actuated in response to a stroke for selectively allowing light to reach the image sensor and a display configured to present the electronic image. The electronic camera further comprises a controller configured to control the shutter mechanism and the image sensor, the controller comprising a processor and a memory having computer-readable code embodied therein which, when executed by the processor, causes the controller to: open the shutter mechanism, allow light to reach the image sensor for an exposure, cause the image sensor to capture a first digital image of a scene using a first capture setting in response to the stroke and cause the image sensor to capture a second digital image of the scene using a second capture setting in response to the stroke. The first capture setting includes a first setting of a low-end value in a first range for a first variable being one of an aperture, a shutter speed, an ISO sensor gain. The second capture setting includes a second setting of a high-end value in the first range for the first variable.

Consistent with another embodiment, a method of automatically capturing multiple exposures via an electronic camera is provided. The method comprises providing an image sensor configured to capture an electronic image. The method further comprises providing an input system comprising a shutter mechanism configured to be actuated in response to a stroke for selectively allowing light to reach the image sensor. The method further comprises providing a display configured to present the electronic image. The method further comprises providing a controller configured to control the shutter mechanism and the image sensor, the controller comprising a processor and a memory having computer-readable code embodied therein which, when executed by the processor, causes the controller to: open the shutter mechanism, allow light to reach the image sensor for an exposure, cause the image sensor to capture a first digital image of a scene using a first capture setting in response to the stroke and cause the image sensor to capture a second digital image of the scene using a second capture setting in response to the stroke. The first capture setting includes a first setting of a low-end value in a first range fix a first variable being one of an aperture, a shutter speed, an ISO sensor gain. The second capture setting includes a second setting of a high-end value in the first range for the first variable.

Consistent with yet another embodiment, an electronic camera is provided. The electronic camera comprises an image sensor configured to capture an electronic image and a shutter mechanism for selectively allowing light to reach the image sensor. The electronic camera further comprises a controller configured to control the shutter mechanism and the image sensor, the controller comprising a processor and a memory having computer-readable code embodied therein which, when executed by the processor, causes the controller to: open the shutter mechanism, allow light to reach the image sensor for an exposure, automatically cause the image sensor to capture a first digital image of a scene using a first capture setting and automatically cause the image sensor to capture a second digital image of the scene using a second capture setting. The first capture setting includes a first value of at least one of an aperture parameter, a shutter speed parameter, an ISO sensor gain parameter. The second capture setting includes a second value of the at least one of the aperture parameter, the shutter speed parameter, the ISO sensor gain parameter.

DETAILED DESCRIPTION

To facilitate an understanding of embodiments, principles, and features of the present invention, they are explained hereinafter with reference to implementation in illustrative embodiments. In particular, they are described in the context of automatically capturing multiple exposures via an electronic camera. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
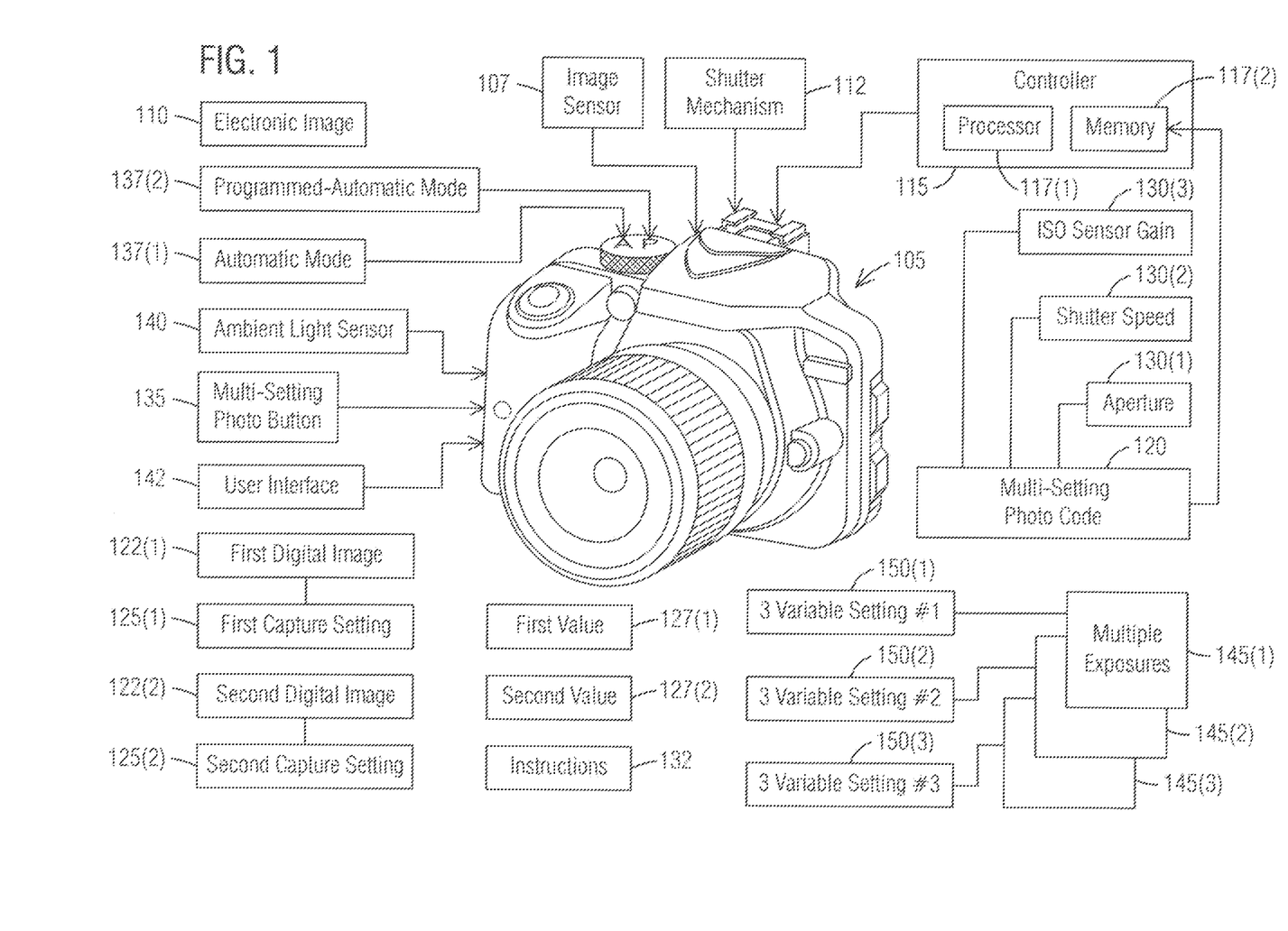
FIG. 1 illustrates a front view of a digital camera in accordance with an exemplary embodiment of the present invention.

FIG. 1 illustrates a front view of a digital or electronic camera 105 in accordance with an exemplary embodiment of the present invention. The electronic camera 105 comprises an image sensor 107 configured to capture an electronic image 110. The electronic camera 105 further comprises a shutter mechanism 112 for selectively allowing light to reach the image sensor 107. The electronic camera 105 further comprises a controller 115 configured to control the shutter mechanism 112 and the image sensor 107. The controller 115 comprises a processor 117(1) and a memory 117(2) having computer-readable code 120 embodied therein which, when executed by the processor 117(1), causes the controller 115 to: open the shutter mechanism 112, allow light to reach the image sensor 107 for an exposure, automatically cause the image sensor 107 to capture a first digital image 122(1) of a scene using a first capture setting 125(1) and automatically cause the image sensor 107 to capture a second digital image 122(2) of the scene using a second capture setting 125(2). The first capture setting 125(1) includes a first value 127(1) of an aperture parameter 130(1), a shutter speed parameter 130(2) and/or an ISO sensor gain parameter 130(3). The second capture setting 125(1) includes a second value 127(2) of the aperture parameter 130(1), the shutter speed parameter 130(2), and/or the ISO sensor gain parameter 130(3).

The controller 115 is further configured to provide instructions 132 to manually adjust the first capture setting 125(1) and the second capture setting 125(2) using at least one additional input received via a button 135. The controller 115 automatically determines the first capture setting 125(1) and the second capture setting 125(1) while in an automatic mode 137(1) or in a programmed-automatic mode 137(2).

The controller 115 automatically alters an exposure parameter by altering the aperture parameter 130(1), the shutter speed parameter 330(2), and/or the ISO sensor gain parameter 130(3) based on a lighting condition sensed by an ambient light sensor 140. The controller 115 provides the instructions 132 to manually adjust the first capture setting 125(1) and the second capture setting 125(2) using at least one additional input received via a user interface 142 when not in the automatic mode 137(1) or in the programmed-automatic mode 137(2).

For example, the electronic camera 105 automatically captures multiple exposures 145(1-3) based on 3 variable setting #1 150(1), 3 variable setting #2 150(2) and 3 variable setting #3 150(3). The multiple exposures 145(1-3) are captured with a multi-light variable and a multi-capture setting configuration. Three light-variables or light-parameters including an aperture, a shutter speed and an ISO sensor gain are manipulated to provide for example six capture settings for six exposures.

Figure 2:
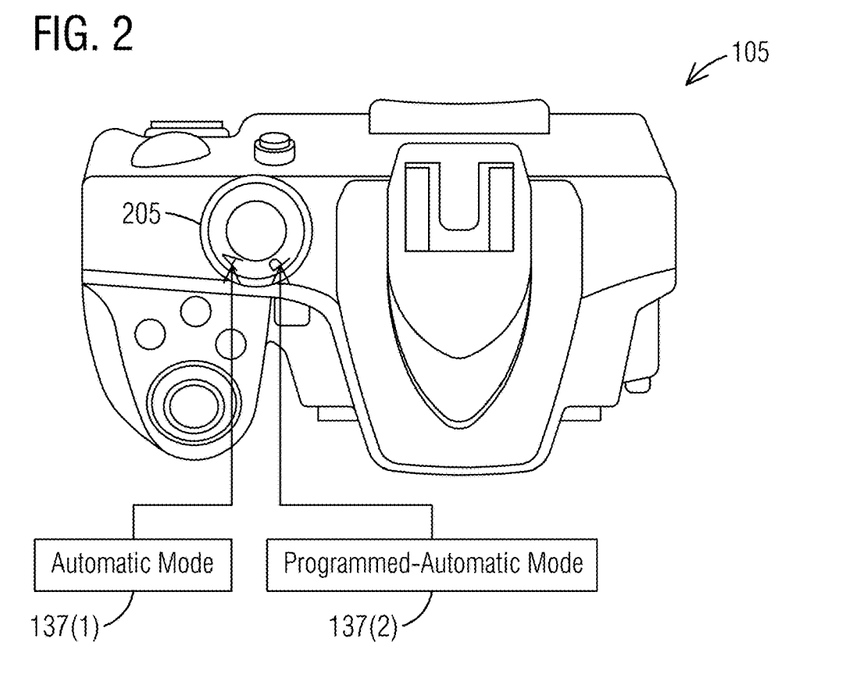
FIG. 2 illustrates a top view of the digital camera of FIG. 1 in accordance with an exemplary embodiment of the present invention.

FIG. 2 illustrates a top view of the digital camera 105 of FIG. 1 in accordance with an exemplary embodiment of the present invention. The electronic camera 105 further comprises a dial 205 with settings "A" and "P". The setting "A" is the automatic mode 137(1). The setting "P" is the programmed-automatic mode 137(2).

Figure 3:
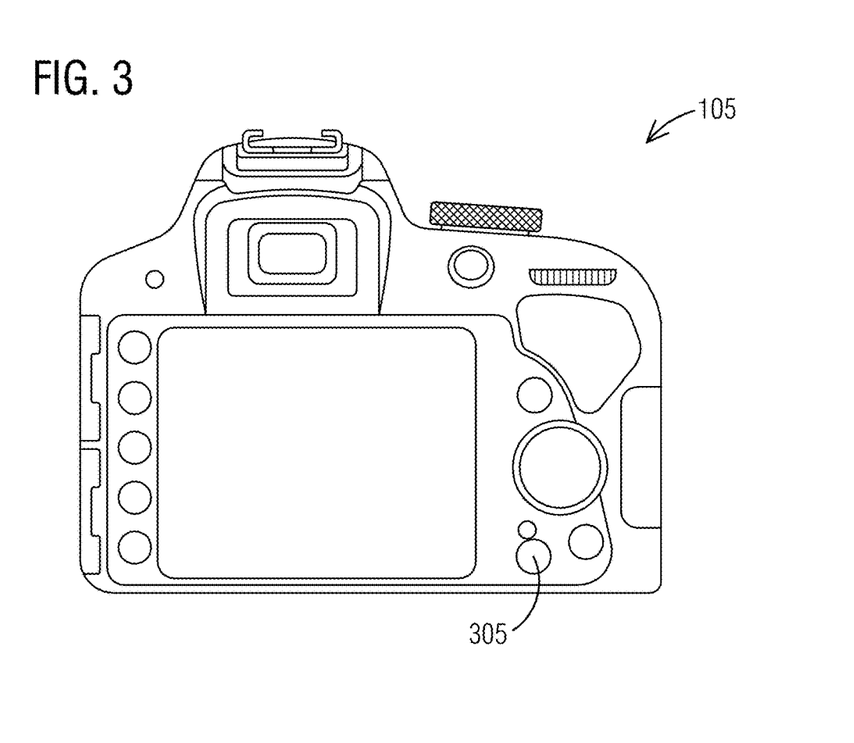
FIG. 3 illustrates a back view of the digital camera of FIG. 1 in accordance with an exemplary embodiment of the present invention.

FIG. 3 illustrates a back view of the digital camera 105 of FIG. 1 in accordance with an exemplary embodiment of the present invention. The electronic camera 105 further comprises a button 305 to manually adjust the first capture setting 125(1) and the second capture setting 125(2) using at least one additional input received via the button 305.

Figure 4:
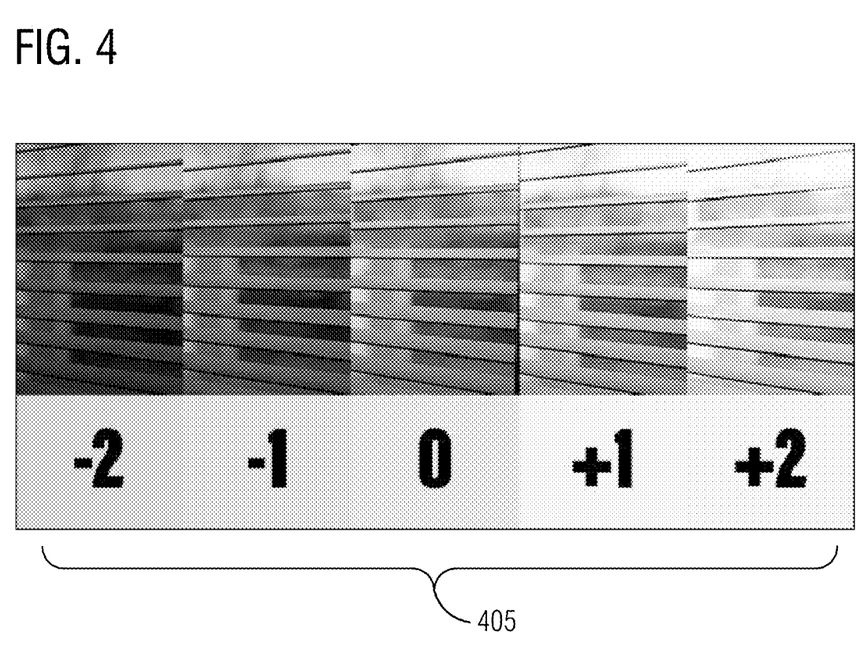
FIG. 4 illustrates views of a scene in a range of exposure compensations in accordance with an exemplary embodiment of the present invention.

FIG. 4 illustrates views of a scene in a range 405 of exposure compensations in accordance with an exemplary embodiment of the present invention. Five exposures are shown from +2 to −2 settings of the exposure compensation parameter. At the value +2 there is more light as the exposure is brighter. At the −2 value there is less light as the exposure is darker.

Figure 5:
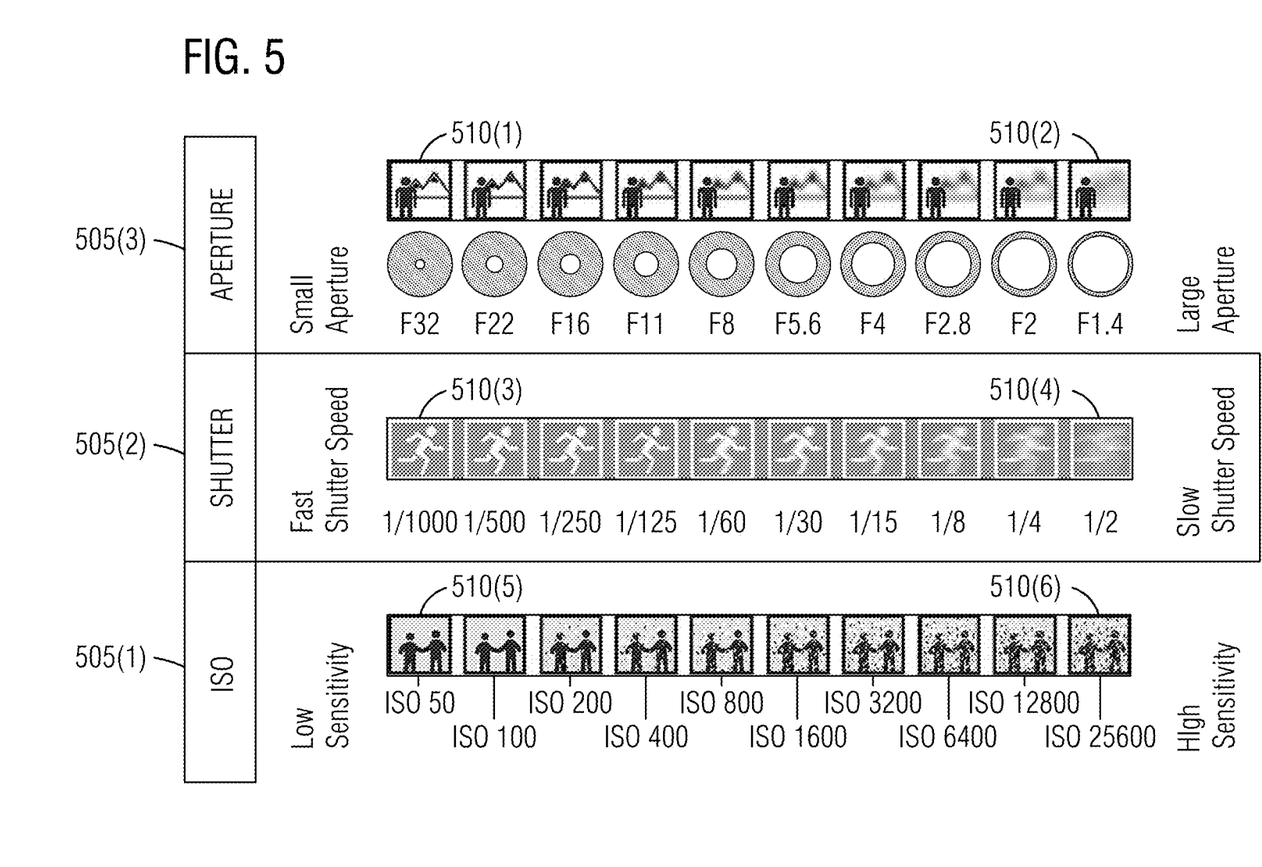
FIG. 5 illustrates a cheat sheet of an ISO sensor gain, a shutter speed and an aperture in accordance with an exemplary embodiment of the present invention.

FIG. 5 illustrates a cheat sheet of an ISO sensor gain 505(1), a shutter speed 505(2) and an aperture 505(3) in accordance with an exemplary embodiment of the present invention. At a small aperture F32 the background in a first exposure 510(1) is clear. At a large aperture F1.4 the background is blurry in a second exposure 510(2). At a fast shutter speed of 1/1000 a third exposure 510(3) is sharp. At a slow shutter speed of ½ a fourth exposure 510(4) is blurry.

At a low sensitivity of ISO sensor gain of ISO50 a fifth exposure 310(5) is clear. At a high sensitivity of ISO sensor gain of ISO25600 a sixth exposure 510(6) is grainy.

Figure 6:
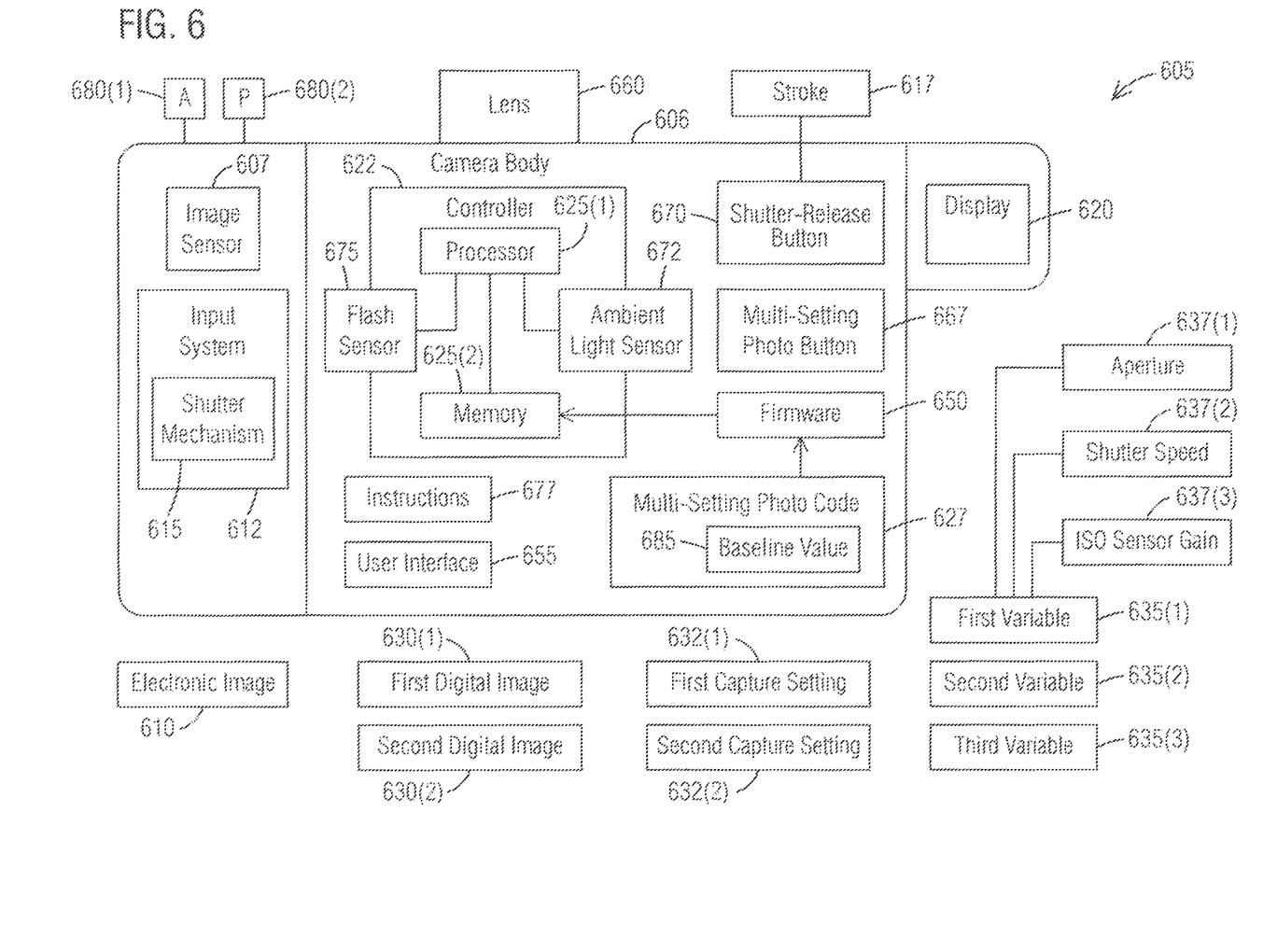
FIG. 6 illustrates a block diagram of a digital camera according to one embodiment of the present invention.

FIG. 6 illustrates a block diagram of a digital or electronic camera 605 according to one embodiment of the present invention. The electronic camera 605 comprises a camera body 606 including an image sensor 607 configured to capture an electronic image 610. The electronic camera 605 further comprises an input system 612 comprising a shutter mechanism 615 configured to be actuated in response to a stroke 617 for selectively allowing light to reach the image sensor 607. The electronic camera 605 further comprises a display 620 configured to present the electronic image 610.

The electronic camera 605 further comprises a controller 622 configured to control the shutter mechanism 615 and the image sensor 607. The controller 622 comprises a processor 625(1) and a memory 625(2) having computer-readable code 627 embodied therein which, when executed by the processor, causes the controller 622 to: open the shutter mechanism 615, allow light to reach the image sensor 607 for an exposure, cause the image sensor 607 to capture a first digital image 630(1) of a scene using a first capture setting 632(1) in response to the stroke 617 and cause the image sensor 607 to capture a second digital image 630(2) of the scene using a second capture setting 632(2) in response to the stroke 617. The first capture setting 632(1) includes a first setting of a low-end value in a first range for a first variable 635(1) being one of an aperture 637(1), a shutter speed 637(2), an ISO sensor gain 637(3). The second capture setting 632(2) includes a second setting of a high-end value in the first range for the first variable 635(1).

The first capture setting 632(1) includes a first setting of a middle-point value in a first range for a second variable 635(2) being one of the aperture 637(1), the shutter speed 637(2) and the ISO sensor gain 637(3). The second capture setting 632(2) includes a first setting of a middle-point value in a first range for a third variable 635(3) being one of the aperture 637(1), the shutter speed 637(2) and the ISO sensor gain 637(3).

The first capture setting 632(1) includes a first setting of a middle-point value in a first range for the shutter speed 637(2). The first capture setting 632(1) includes a first setting of a middle-point value in a first range for the ISO sensor gain 637(3). The first variable 635(1) is the aperture 6370).

The first capture setting 632(1) includes a first setting of a middle-end value in a first range for the aperture 637(1). The first capture setting 632(1) includes a first setting of a middle-point value in a rust range for the ISO sensor gain 637(3). The first variable is the shutter speed 637(2).

The first capture setting 632(1) includes a rust setting of a middle-end value in a first range for the aperture 637(1). The first capture setting 632(1) includes a first setting of a middle-point value in a first range for the shutter speed 637(2). The first variable 635(1) is the ISO sensor gain 637(3).

The second capture setting 632(2) includes a second setting of a middle-point value in a first range for the shutter speed 637(2). The second capture setting 632(2) includes a second setting of a middle-point value in a first range for the ISO sensor gain 637(3). The first variable 635(1) is the aperture 637(1).

The second capture setting 632(2) includes a second setting of a middle-end value in a first range for the aperture 637(1). The second capture setting 632(2) includes a second setting of a middle-point value in a first range for the ISO sensor gain 637(3). The first variable is the shutter speed 637(2).

The second capture setting 632(2) includes a second setting of a middle-end value in a first range for the aperture 637(1). The second capture setting 632(2) includes a second setting of a middle-point value in a first range for the shutter speed 637(2). The first variable 635(1) is the ISO sensor gain 637(3).

The code 627 may be part of a firmware 650. The electronic camera 605 further comprises a user interface 655. The electronic camera 605 further comprises a lens 660 removably coupled to the camera body 606. The electronic camera 605 further comprises a button 667 and a shutter-release button 670. The electronic camera 605 further comprises an ambient light sensor 672 and a flash sensor 675. A lighting condition may be sensed by the ambient light sensor 672. A flash on/off or going to be on/off condition may be sensed by the flash sensor 675.

The controller 622 is further configured to provide instructions 677 to manually adjust the first capture setting 632(1) and the second capture setting 632(2) using at least one additional input received via the button 667. The instructions 677 are presented as text or icons on the display 620 or in audio form. The controller 622 automatically determines the first capture setting 632(1) and the second capture setting 632(2) while in an automatic mode (A) 680(1) or in a programmed-automatic mode (P) 680(2). The controller 622 automatically alters an exposure parameter by altering at least one of a shutter speed parameter, a diaphragm opening parameter, a lighting parameter based on a lighting condition sensed by the ambient light sensor 672, or a flash parameter based on a flash on/off condition sensed by the flash sensor 675. The controller 622 may calibrate the first capture setting 632(1) and the second capture setting 632(2) against a baseline value 683 stored for the aperture 637(1), the shutter speed 637(2) and the ISO sensor gain 637(3) in the memory 625(2) for the code 627 based on the lighting condition sensed by the ambient light sensor 672 and/or the flash on/off condition sensed by the flash sensor 675.

The controller 622 automatically modifies a previous capture configuration by automatically adjusting the first capture setting 632(1) and the second capture setting 632(2). The controller 622 provides the instructions 677 to manually adjust the first capture setting 632(1) and the second capture setting 632(2) using at least one additional input received via the user interface 655.

Figure 7:
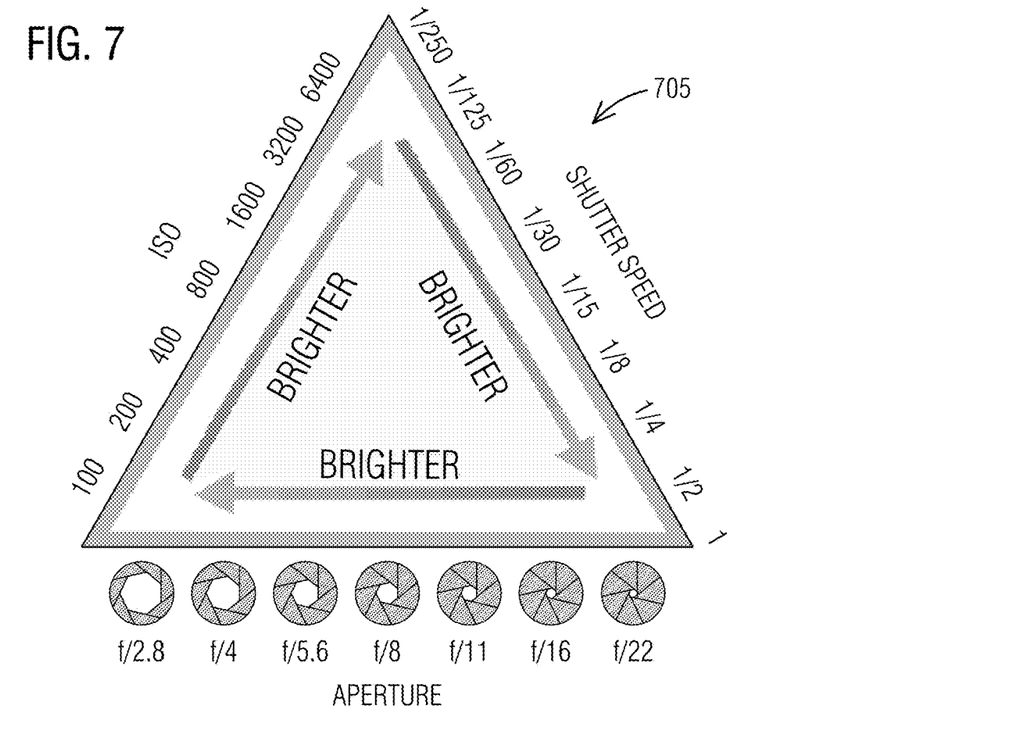
FIG. 7 illustrates an exposure triangle of an ISO sensor gain, a shutter speed and an aperture in accordance with an exemplary embodiment of the present invention.

FIG. 7 illustrates an exposure triangle 705 of an ISO sensor gain, a shutter speed and an aperture in accordance with an exemplary embodiment of the present invention.

Figure 8:
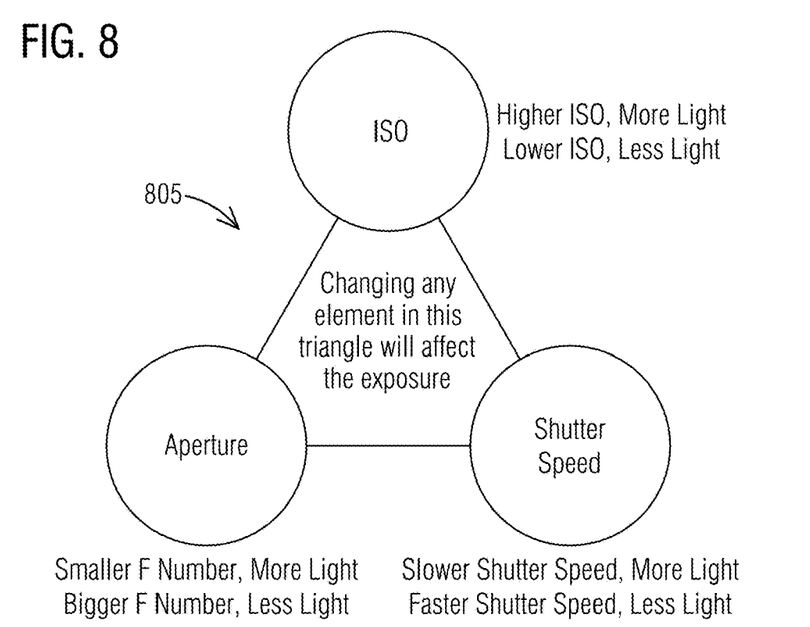
FIG. 8 illustrates another exposure triangle of an ISO sensor gain, a shutter speed and an aperture in accordance with an exemplary embodiment of the present invention.

FIG. 8 illustrates another exposure triangle 805 of an ISO sensor gain a shutter speed and an aperture in accordance with an exemplary embodiment of the present invention.

Figure 9:
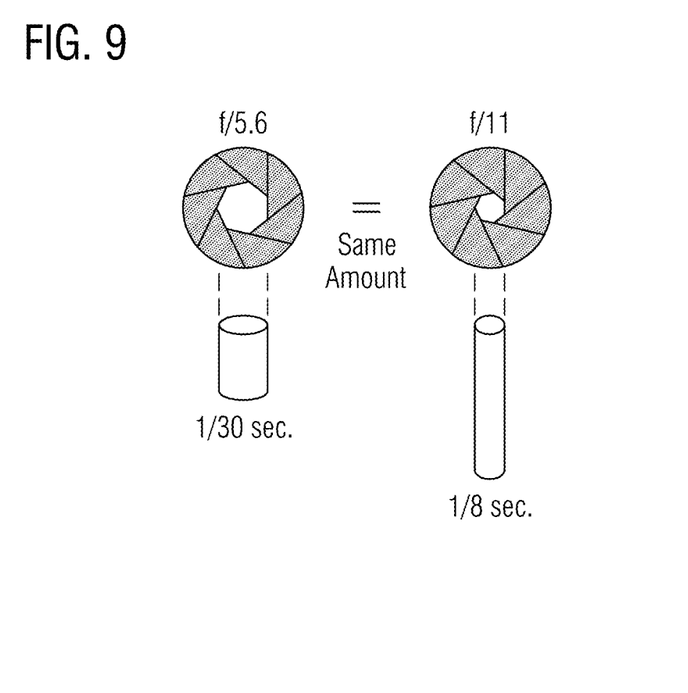
FIG. 9 illustrates a relationship of a shutter speed and an aperture in accordance with an exemplary embodiment of the present invention.
Figure 10:
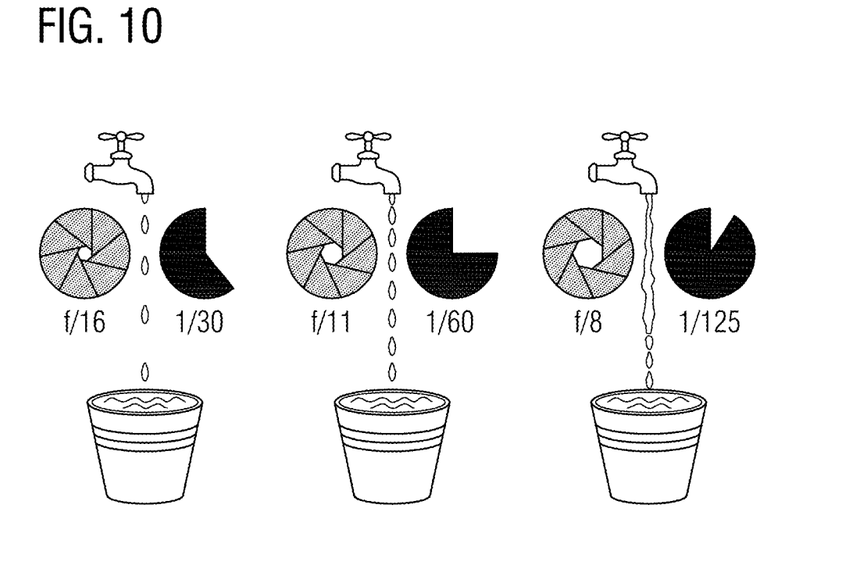
FIG. 10 illustrates another relationship of a shutter speed and an aperture in accordance with an exemplary embodiment of the present invention.

FIG. 9 illustrates a relationship of a shutter speed and an aperture in accordance with an exemplary embodiment of the present invention. FIG. 10 illustrates another relationship of a shutter speed and an aperture in accordance with an exemplary embodiment of the present invention.

Figure 11:
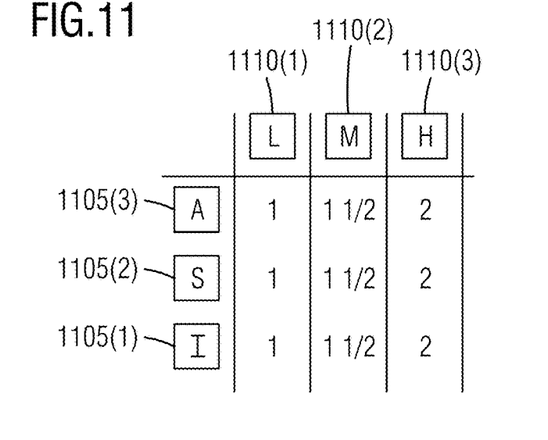
FIG. 11 illustrates a table of light parameter's exemplary values for an ISO sensor gain, a shutter speed and an aperture in accordance with an exemplary embodiment of the present invention.

FIG. 11 illustrates a table of light parameter's exemplary values for an ISO sensor gain (I) 1105(1), a shutter speed (S) 1105(2) and an aperture (A) 1105(3) in accordance with an exemplary embodiment of the present invention. A low (L) 1110(1), middle (M) 1110(2), high (H) 1110(3) values am shown. Numbers "1" "1½", "2" in three columns are just place holders and not real or actual three light parameter values and am picked tor illustration purposes.

Figure 12:
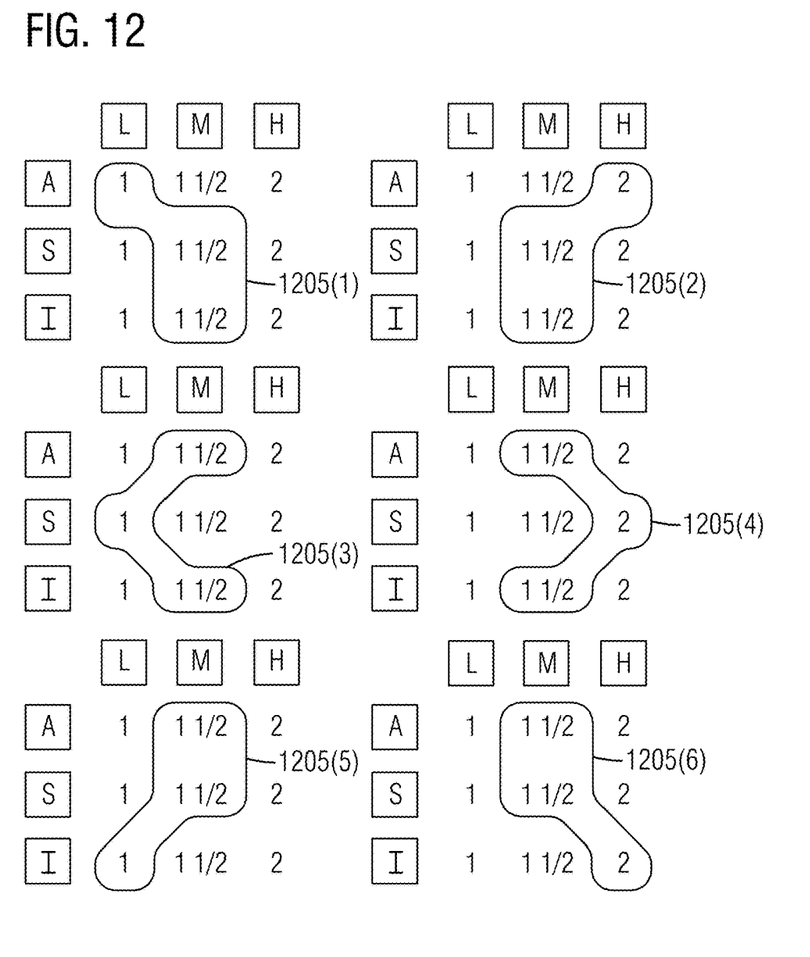
FIG. 12 illustrates six capture settings for six exposures in accordance with an exemplary embodiment of the present invention.

FIG. 12 illustrates six capture settings 1205(1-6) for six exposures in accordance with an exemplary embodiment of the present invention. For example, a first capture setting 1205(1) may be A=1 (bigger F number=less light) and S=1½, I=1½. Likewise, a second capture setting 1205(2) may be A=2 (smaller F number=more light) and S=1½, I=1½. A third capture setting 1205(3) may be A=1½ and S=1 (faster shutter speed=less light), I=1½. A fourth capture setting 1205(4) may be A=1½ and S=2 (slower shutter speed=more light), I=1½. A fifth capture setting 1205(5) may be A=1½ and S=1½, I=1 (lower ISO=less light). A sixth capture setting 1205(6) may be A=1½ and S=1½, I=2 (higher ISO=more light). The A, S, I values "1" "1½", "2" are used to normalize the six capture settings 1205(1-6) across a low-end value of "1", a middle-point value of "1½" and a high-end value of "2" across a range 1-2. Normalization usually means to scale a variable to have a values between 0 and 1 (here 0=1 and 1=2), while standardization transforms data to have a mean of zero and a standard deviation of 1. Normalization of ratings means adjusting values measured on different scales to a notionally common scale, often prior to averaging. Here an intention may be to align distributions to a normal distribution. Normalization also means changing the range of A, S, I light parameter values. Normalization also means general reduction of data to Canonical form.

In the automatic mode (A) 680(1) or in the programmed-automatic mode (P) 680(2), for example, the controller 622 automatically uses the six capture settings 1205(1-6) for capturing the six exposures. The number of exposures can be adjusted in the code 627. The six capture settings 1205(1-6) can be programmed in the code 627 statically or adjusted dynamically based on the lighting condition sensed by the ambient light sensor 672 and/or the flash on/off condition sensed by the flash sensor 675.

In this way, instead of one exposure at a middle grey in the automatic mode (A) 680(1) or in the programmed-automatic mode (P) 680(2) of a DSLR camera multiple exposures are stored in the memory 625(2) for later viewing and selection from the display 620. Memory has become cheap and digital cameras do not use film so multiple shots of one scene are free to have in a digital camera. Pressing of the shutter-release button 670 once or multiple times may trigger the six capture settings 1205(1-6) to take six exposures.

Figure 13:
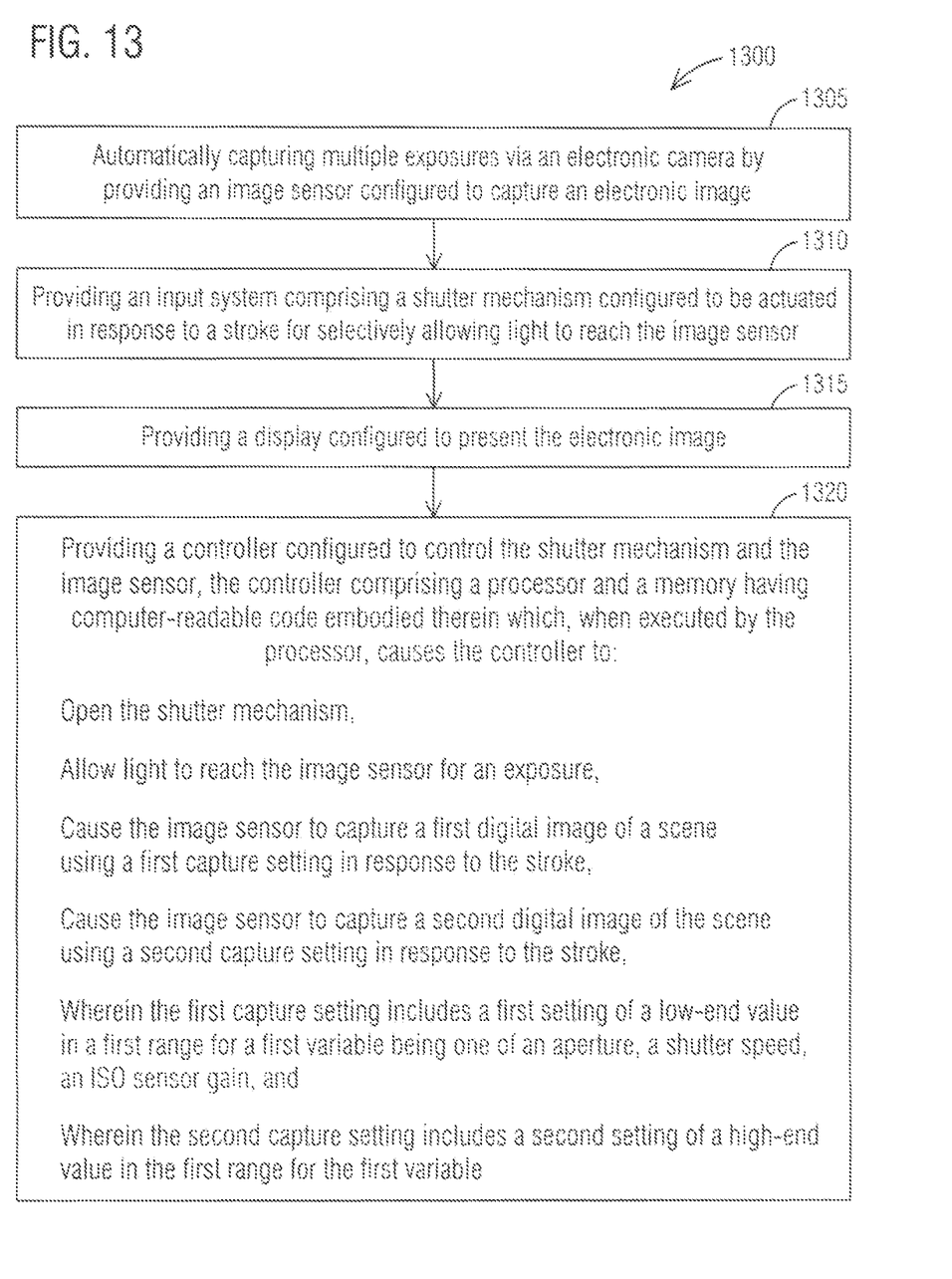
FIG. 13 illustrates a flow chart of a method of automatically capturing multiple exposures via an electronic camera in accordance with an exemplary embodiment of the present invention.

FIG. 13 illustrates a flow chart of a method 1300 of automatically capturing multiple exposures via an electronic camera in accordance with an exemplary embodiment of the present invention. Reference is made to the elements and features described in FIGS. 1-12. It should be appreciated that some steps are not required to be performed in any particular order, and that some steps are optional.

The method 1300 comprises a step 1305 of providing an image sensor configured to capture an electronic image. The method 1300 comprises a step 1310 of providing an input system comprising a shutter mechanism configured to be actuated in response to a stroke for selectively allowing light to reach the image sensor. The method 1300 comprises a step 1315 of providing a display configured to present the electronic image.

The method 1300 comprises a step 1320 of providing a controller configured to control the shutter mechanism and the image sensor. The controller comprises a processor and a memory having computer-readable code embodied therein which, when executed by the processor, causes the controller to: open the shutter mechanism, allow light to reach the image sensor for an exposure, cause the image sensor to capture a first digital image of a scene using a first capture setting in response to the stroke and cause the image sensor to capture a second digital image of the scene using a second capture setting in response to the stroke. The first capture setting includes a first setting of a low-end value in a first range for a first variable being one of an aperture, a shutter speed, an ISO sensor gain. The second capture setting includes a second setting of a high-end value in the first range for the first variable.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An electronic camera comprising:
an image sensor configured to capture an electronic image;
an input system comprising a shutter mechanism configured to be actuated in response to a stroke for selectively allowing light to reach the image sensor;
a display configured to present the electronic image; and
a controller configured to control the shutter mechanism and the image sensor, the controller comprising a processor and a memory having computer-readable code embodied therein which, when executed by the processor, causes the controller to:
upon determining a programmed value in the code specifying multiple exposures, wherein each exposure corresponds to a different capture setting associated with the electronic camera, open the shutter mechanism,
allow light to reach the image sensor for an exposure,
cause the image sensor to capture a first digital image of a scene using a first capture setting in response to the stroke and save the first digital image in the memory,
cause the image sensor to capture a second digital image of the scene using a second capture setting in response to the stroke and save the second digital image in the memory,
cause the image sensor to capture a third digital image of the scene using a third capture setting in response to the stroke and save the third digital image in the memory,
wherein the first capture setting includes: a first setting of a low-end value in a first range for a first variable being an aperture, a first setting of a middle-point value in the first range for: a second variable different from the first variable being a shutter speed, a third variable different from the first variable and the second variable being an ISO sensor gain,
wherein the second capture setting includes: a second setting of a middle-point value in the first range for the first variable, the second variable and a second setting of a low-end value in the first range for the third variable,
wherein the third capture setting includes: a third setting of a middle-point value in the first range tor the first variable, the second variable and a third setting of a high-end value in the first range for the third variable, and
at a later time, allow the user of the electronic camera to view all the first digital image corresponding to the first capture setting, the second digital image corresponding to the second capture setting and the third digital image corresponding to the third capture setting.

2. The electronic camera of claim 1, wherein the controller to:
cause the image sensor to capture a fourth digital image of the scene using a fourth capture setting in response to the stroke,
cause the image sensor to capture a fifth digital image of the scene using a fifth capture setting in response to the stroke,
cause the image sensor to capture a sixth digital image of the scene using a sixth capture setting in response to the stroke.

3. The electronic camera of claim 2, wherein the fourth capture setting includes: a second setting of a high-end value in a first range for the first variable, a second setting of a middle-point value in the first range tor the second variable, the third variable.

4. The electronic camera of claim 3, wherein the fifth capture setting includes: a third setting of a middle-pint value in the first range for the first variable, the third variable and a second setting of a low-end value in the first range for the second variable.

5. The electronic camera of claim 4, wherein the sixth capture setting includes: the third setting of a middle-point value in the first range for the first variable, the third variable and a third setting of a high-end value in the first range for the second variable.

6. The electronic camera of claim 1, wherein the controller automatically determining the first capture setting and the second capture setting while in an automatic mode or in a programmed-automatic mode.

7. The electronic camera of claim 1, wherein the controller automatically altering an exposure parameter by altering at least one of a shutter speed parameter, a diaphragm opening parameter, or a lighting parameter based on a lighting condition sensed by an ambient light sensor.

8. The electronic camera of claim 1, wherein the controller automatically modifying a previous capture configuration by automatically adjusting the first capture setting and the second capture setting.

9. The electronic camera of claim 1, wherein the controller providing instructions to manually adjust the first capture setting and the second capture setting using at least one additional input received via a user interface.

* * * * *